July 30, 1968 R. GILMONT 3,395,083
LABORATORY DISTILLING APPARATUS
Filed April 8, 1966 3 Sheets-Sheet 1

INVENTOR.
ROGER GILMONT
BY
James and Franklin
ATTORNEY

July 30, 1968 R. GILMONT 3,395,083
LABORATORY DISTILLING APPARATUS
Filed April 8, 1966 3 Sheets-Sheet 3

INVENTOR
ROGER GILMONT
BY James and Franklin
ATTORNEY

United States Patent Office 3,395,083
Patented July 30, 1968

3,395,083
LABORATORY DISTILLING APPARATUS
Roger Gilmont, 38—41 240th St.,
Douglaston, N.Y. 11363
Filed Apr. 8, 1966, Ser. No. 541,217
14 Claims. (Cl. 202—83)

ABSTRACT OF THE DISCLOSURE

Laboratory distilling apparatus in which the condenser through which the distilling liquid flows for preheating has an overflow outlet and a feed outlet, with both of which the distilling liquid communicates, a vent is provided through which impurities volatilized by such preheating can escape, the distilling liquid is further preheated by waste heat from the separator while at the same time volatiles in the separator are condensed, and a further vent is provided through which volatile impurities accompanying the still hot condensed purified liquid can escape.

---

The present invention relates to a system for liquid distillation, and particularly to one designed to function on a continuous basis.

Distillation of liquids for purification purposes is an old procedure, and many systems have been devised for that purpose. They vary widely in complexity and efficiency, and consequently in initial cost and operating expense. They also vary widely in the degree of purification which they produce, and the almost universal rule is: the greater the purification, the greater the complexity and cost. Moreover, in most instances, and particularly in the case of portable laboratory-type equipment, there is a very restricted limit on the time during which the system can function continuously. Impurities tend to accumulate within the system, so that after the system has been in operation for a period of time the distilling operation must be interrupted and the system flushed or cleaned.

It is the prime object of the present invention to devise a distilling system in which the above disadvantages are eliminated or minimized. In particular, the present invention provides a small, portable system which is simple, inexpensive and dependable, which operates efficiently and at low cost, which is self-cleaning and therefore may be operated continuously for virtually unlimited periods of time, and which produces a distillate output of exceptionally high purity. Indeed, the purification effect is so marked that the system of the present invention would be advantageous even if that were its only advantage. The fact that it exhibits its other advantages of simplicity, high efficiency, low cost, and capability of continuous operation for very long periods of time make it a significant advance in the field of distillation.

Figure 1:
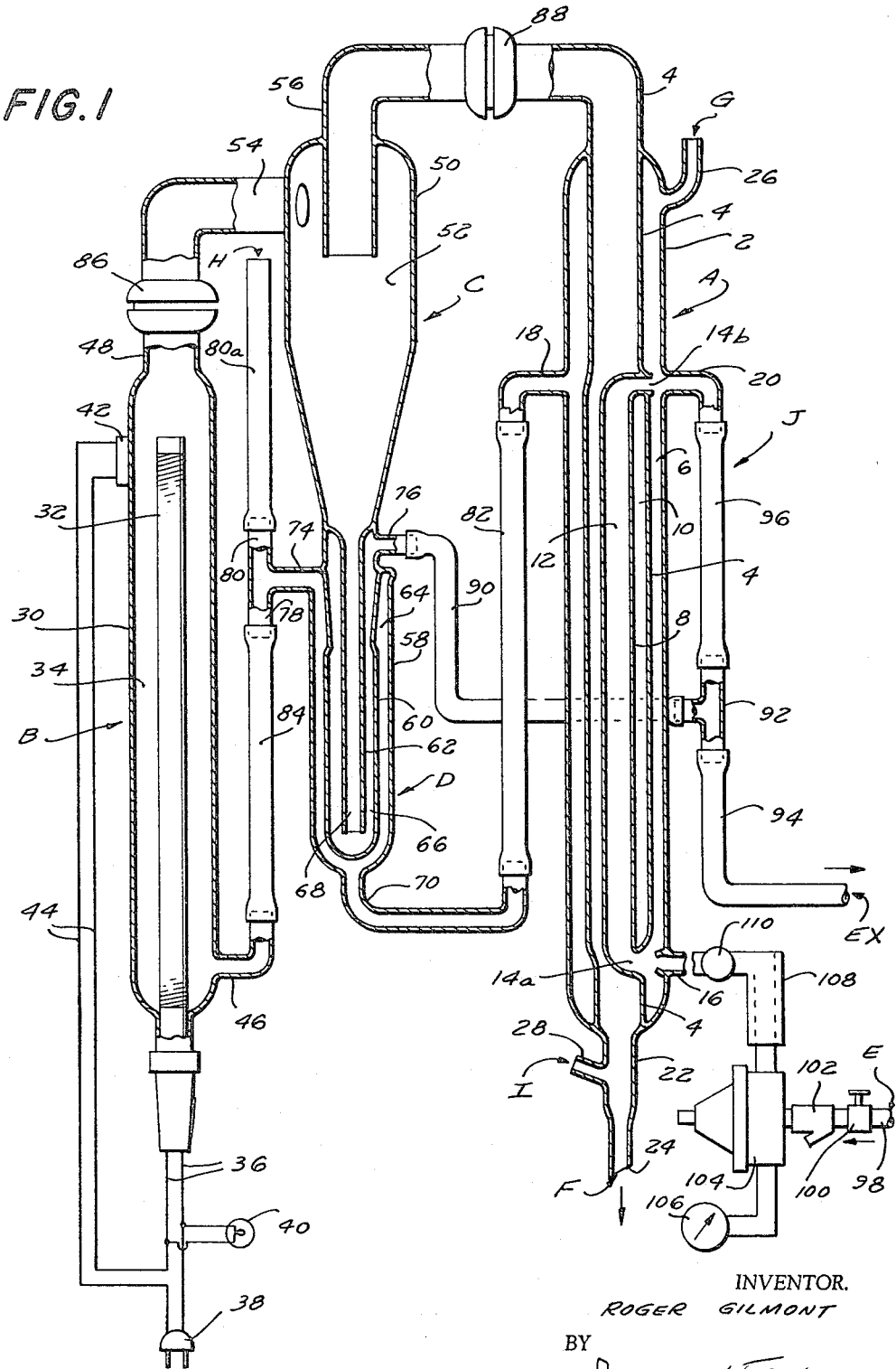
Figure 2:
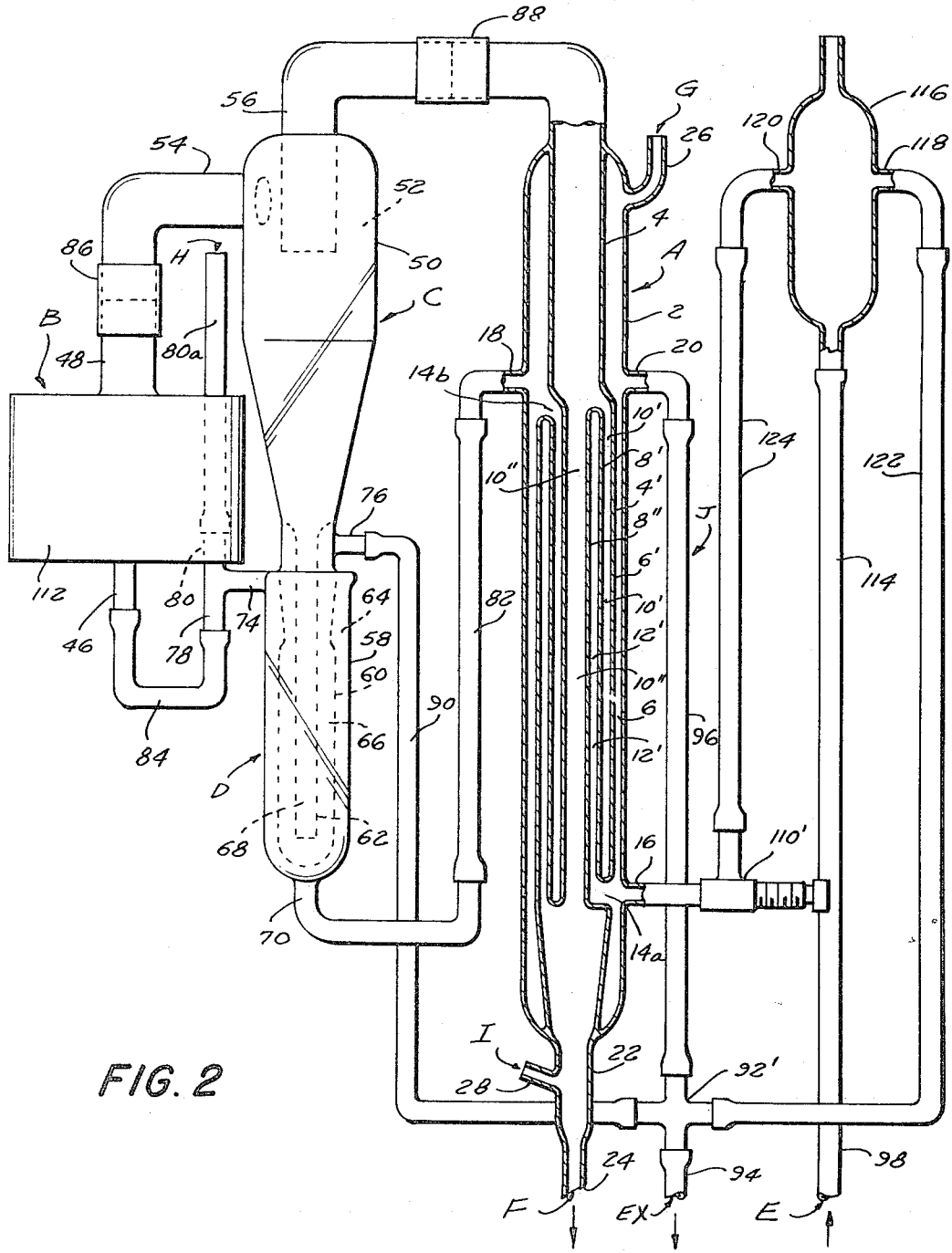

In accordance with the present invention the liquid to be distilled (hereinafter designated "tap water" for purposes of ready explanation, since a system for tap water distillation is shown in FIGS. 1 and 2, but with the understanding that the device can be used to distill other liquids as well) may be used as the coolant in the unit which condenses the distilled vapors in order to produce the liquid distillate. This, of course, raises the temperature of the tap water, and tends to volatilize certain low-boiling-point impurities present in the tap water. In order to permit this effect to be usefully realized, a vent is provided in the condenser to permit the thus-volatilized impurities to escape from the system.

The tap water passes through an evaporator where it is converted into steam. In connection with this part of the operation of the system, the construction and heat-production of the evaporator and the rate of flow of tap water thereto are so correlated that the tap water is virtually instantaneously vaporized, no residue tap water remains in the evaporator, the action of the evaporator producing an inherent scouring or cleaning effect. The steam produced in the evaporator escapes therefrom and carries with it undistilled impurities and such droplets of residue tap water as may not have been converted into vapor.

The output from the evaporator goes to a cyclone separator, where the purified vapor content of the evaporator output is separated from the solids and liquid content thereof. The vapor content of the evaporator output is fed to the condenser. The remainder of the evaporator output is fed to a trap which vents to exhaust.

The tap water, already heated by the steam in the condenser, is preferably caused to pass through the separator trap in heat-transfer relation to the contents of that trap. As a result, the trap contents, which are at a high temperature close to the boiling point of water, additionally preheat the tap water, thus bringing the tap water nearly to the boiling point before it reaches the evaporator. This greatly assists in producing the desired automatic cleaning and scouring effect of the evaporator operation. In addition, a vent is provided in the tap water feed system adjacent the point where the tap water leaves the trap, thereby to permit the escape of such impurities as may be volatilized from the tap water by reason of the heating action produced in the separator trap.

As a final step in the production of a highly purified distillate, a vent is provided in the condenser which communicates with a distillate exit path at a point where the distillate has been condensed to liquid phase, thereby to permit the escape of such impurities as may still be present in volatilized form at that point before such impurities can recondense and contaminate the distillate.

Figure 3:
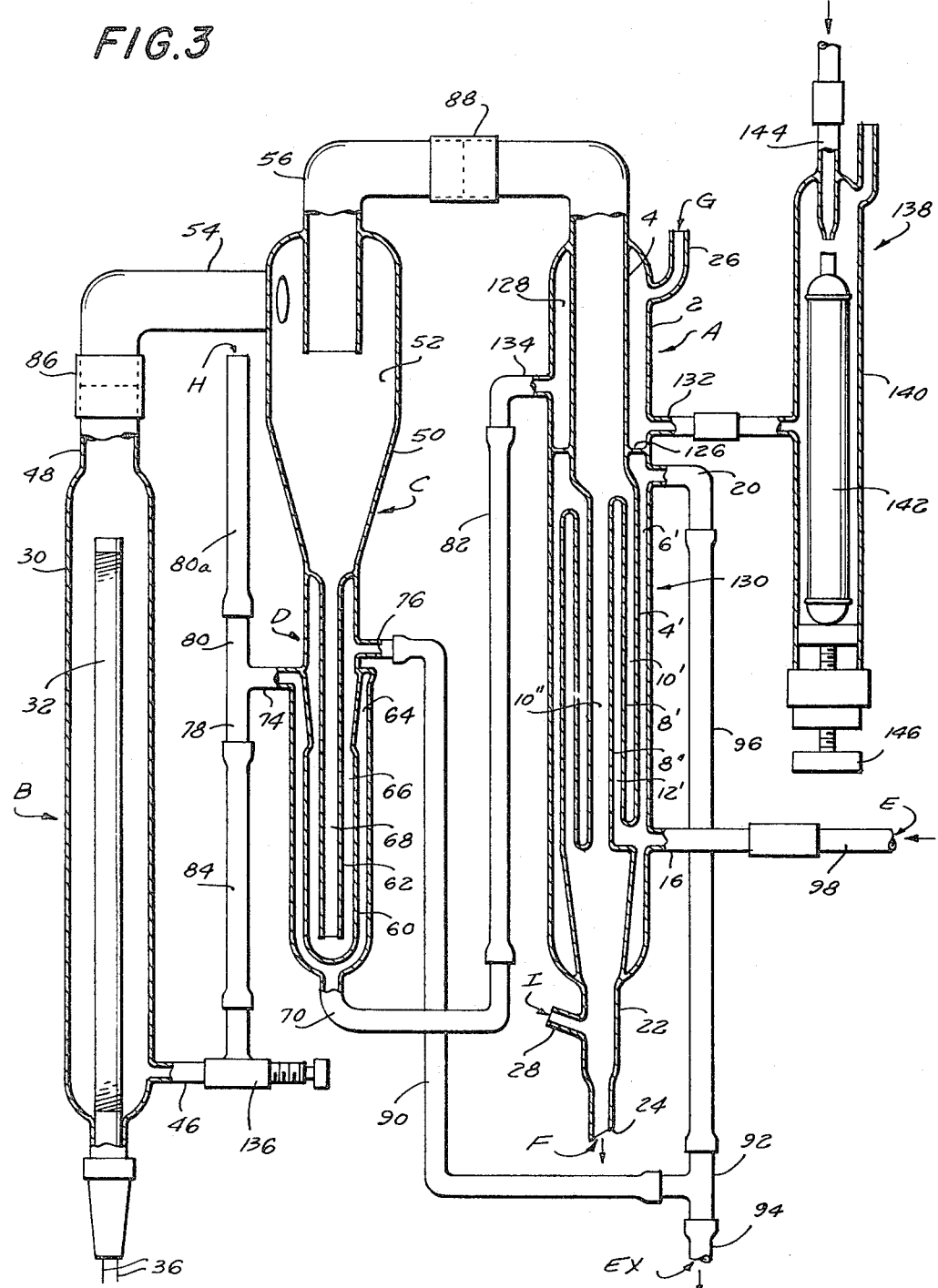

By suitable modifications the still may be used to additionally purify already distilled water, in which case tap water may be used as the cooling medium in the condenser and one or the other or both of the preheating actions carried out in the condenser and the separator trap may be dispensed with, although for best operation, and as illustrated in FIG. 3, it is preferred that both of those preheating steps, together with the venting actions associated therewith, be carried out.

The entire system is designed to operate on the basis of a continuous flow of liquid for condenser cooling and for distillate supply, with a continuous cleaning of the system during operation and the automatic removal of impurities from that system. As a result, there is no impurity build-up in any part of the system. Hence, operation can continue for exceptionally long, and theoretically unlimited, periods of time.

To the accomplishment of the above, and to such other objects as may hereinafter appear, the present invention relates to a distilling system as defined in the appended claims and as described in this specification, taken together with the accompanying drawings, in which:

FIG. 1 is a cross sectional view of one embodiment of the present invention which uses tap water both for cooling and as the liquid to be distilled;

FIG. 2 is a cross sectional view of a second embodiment of the present invention, similar to FIG. 1 but differing therefrom in certain respects; and FIG. 3 is a cross sectional view of a third embodiment of the present invention which further purifies water which has already been distilled or otherwise previously purified to some degree, tap water being used only for cooling purposes within the condenser.

The distilling system of FIG. 1 comprises a condenser generally designated A, an evaporator generally designated B, and a separator generally designated C provided with a trap generally designated D. The liquid to be distilled enters at point E and flows through the condenser A and the separator trap D to the evaporator B, where it is volatilized. The output from the evaporator B enters the separator C, where its gaseous portion is separated from its solid and liquid portion. The gaseous portion is conveyed to the condenser A, where it is condensed into liquid and from which the distillate emerges at point F. The solids and liquids content of the evaporator output passes through the separator trap D (a small but steady flow of waste water therethrough is envisaged) and is then vented to waste, at point EX. The condenser is provided with a vent generally designated G, and the separator trap D is provided with a vent generally designated H, both in gaseous communication with the tap water, from which vents impurities volatilized from the tap water heated as a result of its passage through the condenser A and the separator D respectively can escape from the system. The condensed distillate is also vented, at I, so that the last vestiges of volatile impurities can escape from the system and not subsequently contaminate the distillate. More cooling liquid is needed in the condenser A than can subsequently be distilled on a continuous basis, and consequently the excess cooling water is vented from the condenser by means generally designated J.

The condenser A comprises a body 2 having an inner tube 4 extending down therethrough from top to bottom, the inner tube 4 being spaced from the outer wall 2 by a space generally designated 6. A second tube 8 is received within the tube 6, radially inwardly spaced therefrom over a portion of the length of the tube 6, thus defining a space 10 between the tubes 6 and 8 and a space 12 inside the tube 8. The spaces 6 and 12 communicate with one another at their lower and upper ends respectively, at points 14a and 14b respectively. An inlet tube 16 communicates with the spaces 6 and 12 at the lower end of the condenser C. A pair of outlet tubes 18 and 20 communicate with the spaces 6 and 12 at their upper ends, the outlet tube 20 preferably being at a slightly higher elevation than the tube 18. The difference in height is not critical, and may be on the order of a few millimeters. The inner tube 4 communicates, at the bottom of the condenser A, with an outlet tube 22 terminating in tip 24. An open-ended tube 26 constituting the vent G communicates with the space 6 above the tubes 18 and 20, and an open-ended tube 28 constituting the vent I communicates with the tube 22 above the tip 24.

The evaporator B comprises, in the form specifically disclosed in FIG. 1, an elongated glass tube 30 within which an elongated electrically energized heater element 32 is disposed, a narrow elongated space 34 being defined between the heating element 32 and the wall 30. The heating element 32 is electrically connected to leads 36 which extend to a plug 38 adapted to be received in any suitable electrical outlet. A pilot light 40 may be inserted in the electrical circuit to indicate when the heating element 32 is energized. A thermostatic safety device 42 may be secured to the outer surface of the wall 30 and connected by leads 44 into the electrical circuit for the heater element 32, in order to terminate heater operation if overheating occurs. The wall 30 of the evaporator B is provided at its lower end with an input tube 46, and the evaporator B is provided at its upper end with an outlet tube 48.

The separator C, designed to operate on the cyclone principle, comprises an enclosure wall 50 defining a cyclone separator space 52. An input tube 54 communicates in an off-center tangential manner with the upper portion of the space 52. A gas output tube 56 extends through the top portion of the wall 50 and projects into the separator space 52 to a position below the input point of the tube 54.

The separator trap D is connected to the bottom of the separator C, and comprises an outer wall 58 and radially spaced coaxial inner walls 60 and 62. The wall 60 is closed at its bottom end and is connected to the wall 58 at its upper end. The wall 62 is open at its lower end and communicates with the separator space 52. Spaces 64 and 66 are defined respectively between the wall 58 and the tube 60 and the tubes 60 and 62, and a space 68 is defined inside the tube 62. The bottom of trap D is provided with an inlet tube 70 which communicates with the space 64 at its lower end and with an exhaust tube 74 which communicates with the space 64 at its upper end. The trap D is also provided with an exhaust tube 76 which communicates with the space 66 at its upper end. The tube 74 ends in two branches 78 and 80 directed respectively downwardly and upwardly; the branch 78 serves as a fluid conduit and the branch 80 serves as the gaseous vent H.

The connections between the units A, B, C and D in the embodiment of FIG. 1 are as follows: Tube 82 connects the condenser outlet tube 18 to the trap inlet tube 70. Tube 84 connects the trap outlet tube branch 78 to the evaporator inlet tube 46. Coupling 86 connects the evaporator outlet tube 48 to the cyclone inlet tube 54. Coupling 88 connects the cyclone gaseous output tube 56 to the input tube 4 at the top of the condenser A. Tube 90, T-joint 92 and tube 94 connects the output tube 76 of the trap D to exhaust point EX. Tube 96, T-joint 92 and tube 94 connects the condenser output tube 20 to exhaust point EX.

In the system of FIG. 1 the tap water functions both as a cooling fluid and as the supply of liquid to be distilled. It enters through tube 98 and passes through on-off valve 100 and strainer 102 to adjustable pressure regulator 104 provided with pressure gauge 106. From there it passes through flow meter 108 and needle valve 110 to the inlet tube 16 of the condenser A.

In the operation of the system of FIG. 1 the tap water, the rate of flow of which is controlled through adjustment of the needle valve 110, passes up through the spaces 6 and 12 in the condenser A to the exhaust pipes 18 and 20. In normal operation tap water will overflow through both of the pipes 18 and 20, that portion of the tap water overflowing through the pipe 20 exhausting at point EX via tube 96, T-joint 92 and tube 94. That portion of the tap water which overflows through tube 18 will pass through tube 82 to trap inlet pipe 70 and will flow up through the space 64 in the trap T, exiting therefrom through the trap tube 74. The water will then flow downwardly through T-branch 78 and tube 84 to the evaporator inlet tube 46. It will enter the evaporator B at the bottom of the space 34 and will there be heated by the heater element 32, the steam thus produced and such liquid or solid components as may be present moving up through the space 34 in the evaporator B and exiting through tube 48, from which it passes through the cyclone separator inlet tube 54 into the cyclone separator space 52. As the gas with entrained liquid and solid components spins in the space 52, the liquid and solid components thereof, and such portions of the gaseous component thereof which condense during this operation, will flow into the trap D, passing down through space 68 and up through space 66 and then flowing to exhaust EX via tube 76, tube 90, T-joint 92 and tube 94. The gaseous contents of the cyclone separator space 52 will pass through tubes 56 and 4 and move downwardly through space 10 in the condenser A. Since space 10 extends alongside spaces 6 and 12 and is in heat-transfer communication with them, the gas will be cooled by the tap water flowing through the spaces 6 and 12 and will condense, the liquid distillate produced thereby flowing out of the bottom of the condenser A through the tube 22 and the tube tip 24.

As the tap water flows up along the spaces 6 and 12 it will be heated. When it reaches the level of the exit tubes 18 and 20 it will therefore be at an elevated temperature, and some impurities which may have been in the tap water initially may have volatilized at that point. These volatilized impurities will flow into the space between the tubes 2 and 4 above the level of the tubes 18 and 20, and will escape from the system through the tube 26 constituting the vent G. The heated tap water will then enter the separator trap D and flow upwardly through the space 64, thus being in heat-transfer relationship with the liquid in the spaces 66 and 68, that trap liquid constituting the liquid output from the separator C, which is at a temperature very close to the boiling point of water. A small but steady flow through the trap spaces 66 and 68 should be maintained. Thus, the tap water, as it passes through the trap D, is again heated, and when it leaves the trap D it is at a greatly elevated temperature, preferably one quite close to its boiling point. Additional volatile impurities in the tap water may be volatilized at this point, and they are permitted to escape through the branch 80, which is preferably provided with an upward extension 80a into which a column of tap water liquid may extend.

Since the water to be distilled, when it enters the evaporator B, is at a very high temperature, preferably almost at its boiling point, boiling will commence very quickly after it enters the space 34, and the heating capacity of the heating element 32, coupled with the rate of flow of water into the space 34, is such that not only is virtually all of the water converted into steam in the evaporator B, and substantially instantaneously, but the flow of steam therethrough is sufficiently great so as to carry with it all of the non-volatilized components of the tap water, as well as the droplets of residue tap water as may not have been converted into vapor. The provision of a narrow elongated space 34 through which the tap water and its evaporation products flow as they pass through the evaporator B assists in the attainment of this result. Consequently the evaporator B is self-cleaning, with all impurities being removed therefrom as fast as they are produced.

The waste portion of the evaporator output, which includes the undistilled impurities, such water as may not have been converted into steam in the evaporator, and such portion of the gaseous output of the evaporator as may condense during its stay within the separator space 52, passes to the trap D and then to exhaust EX.

Thus, the volatile impurities escape through vents G and H defined by the tubes 26 and 80, 80a respectively, and the nonvolatile impurities are carried out of the system through the trap D by the flow of waste water therethrough, all continuously as the still operates. Consequently the entire system is self-cleaning, there is no build-up of impurities within the system, and the system may be continuously operated for an exceptionally long, and theoretically unlimited, period of time.

In setting up the system it is preferred that the level of the outlet tube 18 through which the fluid to be distilled passes is located above the upper level of the trap space 64, which is in turn above the inlet point 46 of the evaporator B, so that the flow of liquid to be distilled may be gravity impelled throughout. In operation, for each approximately eight parts of tap water fed to the system, six parts overflow through tube 20, and thus function only as condenser coolant. Two parts overflow through tube 18 and constitute the liquid to be distilled. Of these two parts, approximately one part ends up as distillate emerging from tube tip 24, the other part flowing through the trap D and joining the six parts of cooling fluid in pasisng to exhaust. The rate of flow of the input tap water is adjusted at the needle valve 110 for optimum results. If insufficient flow is provided the temperature of the distillate will be very high and, in extreme cases, uncondensed steam may escape from the tube tip 24. If excessive flow is provided the temperature of the distillate will be approximately at the temperature of the input tap water. Experience has shown that optimum results are achieved when the distillate, as it emerges from the system at F, is warm but not hot. With tap water supplied at a temperature of approximately 50° F. an input rate of flow of from four to five gallons per hour is feasible, producing an output of highly purified distilled water of approximately 2 liters per hour. The purity of the distillate is exceptionally high— it is pyrogen-free, has a resistivity of at least $1 \times 10^6$ ohm-centimeters, and contains no more than 0.5 part per million of total solids.

The embodiment of FIG. 2 is essentially similar to that of FIG. 1, and where appropriate, similar reference numerals will be used. It differs from the system of FIG. 1 primarily in the use of a specifically different type of evaporator B, in the specific internal construction of the condenser A, and in the means employed for controlling the flow of tap water.

In the system of FIG. 2 the evaporator B comprises a metal casing 112 having a heating element defined by a flat disc with an enclosed spiral heater. The construction of this evaporator B, like the specific construction of the evaporator B shown in FIG. 1, is commercially known and forms no part of the present invention per se. Consequently its details are not here illustrated, it being sufficient to state for present purposes that the same self-cleaning effect is produced in the evaporator B of FIG. 2 as in the evaporator B of FIG. 1.

The condenser A of the system of FIG. 2 differs from the condenser A of the system of FIG. 1 in that coaxial and radially spaced inner tubes 4', 8' and 8" are provided, thus defining spaces 6', 10', 12' and 10". The upper and lower ends of these tubes are connected in such a way that cooling water flows upwardly through the spaces 6' and 12', while the gases to be condensed flow downwardly through spaces 10' and 10". All those spaces are in heat-transfer communication with one another, thereby providing a somewhat more intensified degree of cooling liquid action than that produced in the embodiment of FIG. 1.

The tap water enters at point E and flows up through tube 114 into container 116 which is provided with a pair of output tubes 118 and 120. Tube 118 is connected by tube 122 to the exhaust point EX by joint 92'. Tube 120 is connected by tube 124 to needle valve 110', which in turn communicates with the condenser input tube 16. The container 116 is positioned at an elevation such that its tubes 118 and 120 are above the outlet tubes 18 and 20 of the condenser A by a predetermined distance, the magnitude of that distance controlling the pressure of tap water at the needle valve 110', thus ensuring a constant rate of flow of tap water for a given setting of that valve 110'. Thus the container 116 in the FIG. 2 system functions similarly to the pressure regulator 104 in the FIG. 1 system.

The embodiment of FIG. 3 illustrates a modified system in which the liquid to be distilled and the liquid primarily employed as condenser coolant are separated from one another. In this embodiment the condenser A is provided, around the upper portion of the tube 4, with a transverse wall 126 which divides the interior of the condenser A, outside the tube 4, into vertically separated spaces 128 and 130. The space 130 is used exclusively to guide coolant, and is provided with a bottom inlet tube 16 and an upper outlet tube 20 functioning and connected similarly to the correspondingly numbered tubes in the other systems. The space 128, with which the tube 26 constituting the vent G communicates, is provided adjacent its lower end with an inlet tube 132 and an outlet tube 134. The liquid to be distilled enters through tube 132 and exits through tube 134, and in moving through the space 128 is heated by reason of its heat-transfer relationship with the steam passing through the tube 4 and with the heated cooling liquid just before it passes through the tube 20. Such impurities as may be volatilized by this heating escape through the vent G. The thus pre-heated liquid flows to the evaporator B, preferably through the separator trap D where it is further preheated and from which additional volatile impurities may be vented at H. A flow control valve 136 is provided to regulate the rate of flow through the system of the liquid to be distilled, that valve 136 being here shown between the trap output tube 74 and the evaporator input 46.

A constant pressure heat on the liquid to be distilled is provided by the assembly 138, a float type of control comprising a chamber 140 within which float 142 is received, the upper end of that float 142 closing or opening the tip of inlet pipe 144 depending upon the level of liquid within the chamber 140, thereby maintaining that level at a desired point by adjustment of the external control knob 144.

Although the systems of the present invention have been here specifically described in terms of use for the production of distilled water, and particularly distilled tap water, applications for which they are particularly well adapted, they are not limited to such uses, but are generally adaptable to a wide variety of distillation procedures and to operation on liquids of widely varying compositions. The specific embodiments here disclosed constitute small, light, sturdy and inexpensive assemblies which can be mounted within a suitcase-size portable container, but it will be apparent that the systems may be constructed in widely different sizes and with many different structural variations, all within the spirit of the invention as defined in the following claims.

I claim:

1. In a laboratory distilling apparatus comprising an evaporator, a separator, and a condenser, means for supplying distilling liquid to said evaporator, means for conveying the output of said evaporator to said separator, and means for conveying a desired gaseous part of said evaporator output from said separator to said condenser and there condensing it to a liquid, said condenser being of tubular character and comprising means for causing the distilling liquid, before it reaches said evaporator, to move through said condenser in heat-transfer relation to said desired gaseous part of said evaporator output, thereby to function as cooling fluid condensing the latter; the improvement which comprises a passage through said condenser for said distilling liquid, said passage being formed by a multitubular structure comprising a tube radially spaced from the tubular side wall of the condenser and forming a first space within the inner of said tube and a second space between the inner and outer of said tubes, one of said spaces defining a passage for said gaseous evaporator output and the other of said spaces defining said passage for the flow of distilling liquid, a distilling liquid inlet communicating with said other space at its lower end, and first and second circumferentially spaced outlets communicating with said other space at its upper end, said first outlet being located approximately at or above the level of said second outlet, said first outlet defining a liquid overflow outlet and said second outlet defining a distilling liquid feed outlet for conducting preheated distilling liquid from said condenser to said evaporator.

2. The apparatus of claim 1, in which said condenser further has a vent in gaseous communication with said passage but out of the path of liquid flow of said distilling liquid therethrough, and fluid communication means operatively connected between said condenser outlet and said evaporator, thereby to supply to said evaporator distilling liquid from which entrained gases have been removed via said vent and because of the heating of said distilling liquid as it passes through said condenser.

3. The apparatus of claim 2, in which said fluid communication means between said condenser outlet and said evaporator comprises a trap having two passages in relative heat-transfer relationship, means connecting one of said passages between said condenser outlet and said evaporator, and means connecting the other of said passages between said separator and an exit point.

4. The apparatus of claim 2, in which said fluid communication means between said condenser outlet and said evaporator comprises a trap having two passages in relative heat-transfer relationship, means connecting one of said passages between said condenser outlet and said evaporator, and means connecting the other of said passages between said separator and an exit point, and said trap having a vent in gaseous communication with said one of said trap passages but out of the path of liquid flow therethrough, thereby to provide for additional removal of entrained gases from said distilling liquid via said vent because of the heating of said distilling fluid as it passes through said trap.

5. The apparatus of claim 2, in which said condenser comprises a condensed distillate output conduit in fluid communication with and extending from the heat-transfer portion of said condenser, and a vent in gaseous communication with said conduit but normally out of the path of liquid flow therethrough, thereby to provide for removal of entrained gases from said distillate.

6. The apparatus of claim 2, in which said fluid communication means between said condenser outlet and said evaporator comprises a trap having two passages in relative heat-transfer relationship, means connecting one of said passages between said condenser outlet and said evaporator, and means connecting the other of said passages between said separator and an exit point, and said trap having a vent in gaseous communication with said one of said trap passages but out of the path of liquid flow therethrough, thereby to provide for additional removal of entrained gases from said distilling liquid via said vent and because of the heating of said distilling fluid as it passes through said trap, and in which said condenser comprises a condensed distillate output conduit in fluid communication with and extending from the heat-transfer portion of said condenser, and a vent in gaseous communication with said conduit but normally out of the path of liquid flow therethrough, thereby to provide for removal of entrained gases from said distillate.

7. The apparatus of claim 1, in which said fluid communication means between said condenser outlet and said evaporator comprises a trap having two passages in relative heat-transfer relationship, means connecting one of said passages between said condenser outlet and said evaporator, and means connecting the other of said passages between said separator and an exit point.

8. The apparatus of claim 1, in which said fluid communication means between said condenser outlet and said evaporator comprises a trap having two passages in relative heat-transfer relationship, means connecting one of said passages between said condenser outlet and said evaporator, and means connecting the other of said passages between said separator and an exit point, and said trap having a vent in gaseous communication with said one of said trap passages but out of the path of liquid flow therethrough, thereby to provide for additional removal of entrained gases from said distilling liquid via said vent because of the heating of said distilling fluid as it passes through said trap.

9. The apparatus of claim 8, in which said condenser comprises a condensed distillate output conduit in fluid communication with and extending from the heat-transfer portion of said condenser, and a vent in gaseous communication with said conduit but normally out of the path of liquid flow therethrough, thereby to provide for removal of entrained gases from said distillate.

10. The apparatus of claim 1, in which said condenser comprises a condensed distillate output conduit in fluid communication with and extending from the heat-transfer portion of said condenser, and a vent in gaseous communication with said conduit but out of the path of liquid flow therethrough, thereby to provide for removal of entrained gases from said distillate.

11. In a laboratory distilling apparatus comprising an evaporator, a separator, and a condenser, means for supplying distilling liquid to said evaporator, means for conveying the output of said evaporator to said separator, and means for conveying a desired gaseous part of said evaporator output from said separator to said condenser and there condensing it to liquid and means for conveying another part of said evaporator output to an exit point; the improvement which comprises said means for supplying distilling liquid to said evaporator comprising a trap having two passages in relative heat-transfer relationship, means connecting one of said passages in said distilling liquid supply means in advance of said evaporator, and means connecting the other of said passages in said means for conveying said other part of said evaporator output, whereby the heat in said other part of said evaporator output acts to raise the temperature of said distilling liquid before it reaches said evaporator.

12. The apparatus of claim 11, in which said trap has a vent in gaseous communication with said one of said passages but out of the path of liquid flow therethrough, thereby to supply to said evaporator liquid from which entrained gases have been removed.

13. The apparatus of claim 12, in which said condenser comprises a condensed distillate output conduit in fluid communication with and extending from the heat-transfer portion of said condenser, and a vent in gaseous communication with said conduit but out of the path of liquid flow therethrough, thereby to provide for removal of entrained gases from said distillate.

14. The apparatus of claim 11, in which said condenser comprises a condensed distillate output conduit in fluid communication with and extending from the heat-transfer portion of said condenser, and a vent in gaseous communication with said conduit but out of the path of liquid flow therethrough, thereby to provide for removal of entrained gases from said distillate.

References Cited
UNITED STATES PATENTS

| | | | |
|---|---|---|---|
| 2,129,596 | 9/1938 | Waterman et al. | 203—100 X |
| 2,164,275 | 6/1939 | Ittner | 202—185 X |
| 2,224,925 | 12/1940 | Potts et al. | 203—100 X |
| 2,290,373 | 7/1942 | Lee | 202—185 X |
| 2,842,485 | 7/1958 | Zellner | 202—185 X |
| 3,155,600 | 11/1964 | Williamson | 202—182 X |
| 3,326,778 | 6/1967 | Mock | 203—100 X |

FOREIGN PATENTS 670,439    4/1952    Great Britain.

NORMAN YUDKOFF, *Primary Examiner.*

F. DRUMMOND, *Assistant Examiner.*